Sept. 19, 1961      F. N. REYNOLDS      3,000,041
LEG MOUNTS FOR FURNITURE GLIDE UNITS, OR THE LIKE
Filed July 24, 1959
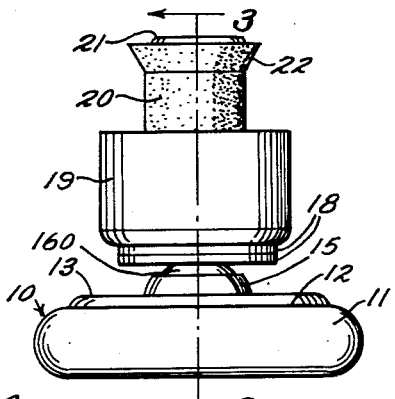
Fig. 1
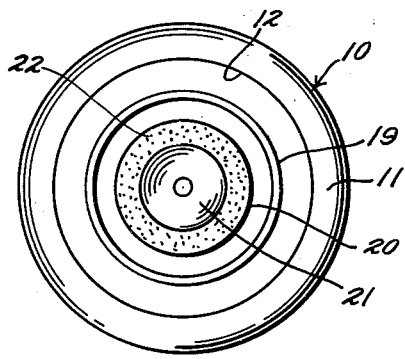
Fig. 2
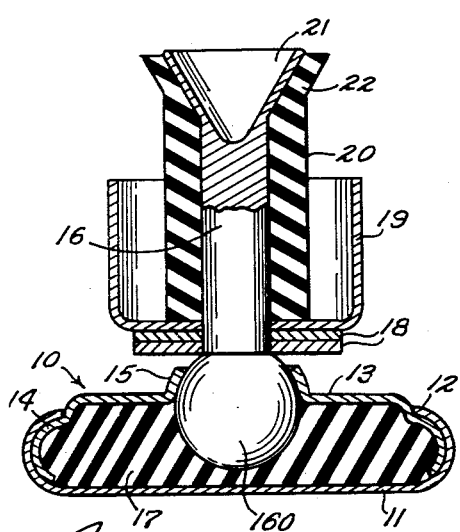
Fig. 3
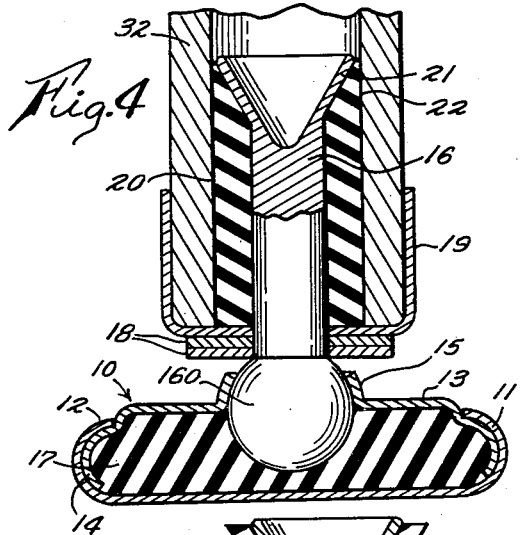
Fig. 4
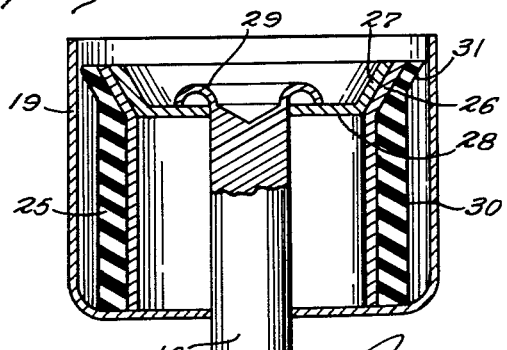
Fig. 5
Fig. 6
INVENTOR.
Frederick N. Reynolds
BY
Murray, Sachkoff & Murray
ATT'YS

United States Patent Office 3,000,041
Patented Sept. 19, 1961

3,000,041
LEG MOUNTS FOR FURNITURE GLIDE UNITS, OR THE LIKE
Frederick N. Reynolds, Augusta, Ky., assignor to The F. A. Neider Company, Augusta, Ky., a corporation of Kentucky
Filed July 24, 1959, Ser. No. 829,263
2 Claims. (Cl. 16—42)

This invention relates to furniture leg mounts for glide, caster or plug units and is particularly directed to an improved attachment means for securing said units to tubular furniture legs, or the like.

In the manufacture of furniture the tubular legs or other terminal portions thereof are presently provided with casters, glides or finishing plugs, or the like. It is customary to supply these glides, casters or plugs to furniture manufacturers as assembled units, each unit having a spring metal mount which is driven into the terminal portions of the tubular furniture, said mount having means thereon for retaining the unit in driven position against forces tending to detach the unit from the furniture during normal usage thereof. Because of the brittleness of these spring metal mounts an undesirable percentage of them are broken during assembly whilst some of the attached units subsequently become defective because of either normal or abnormal forces exerted on the units during ordinary usage of the furniture.

It is, therefore, an object of the invention to provide a novel glide unit and mount that may be economically mass produced, which is readily attached to the hollow ends of tubular furniture and which is non-breakable even under the most severe usage.

Another object of the invention is to provide a rugged, yet simplified resilient, attachment device made as an assembled part of the mass produced glide or plug unit which when attached to the hollow end of a tubular member, such as the leg of furniture, will positively secure said unit to the leg.

The present invention provides an attachment device that has a deformable, resilient sleeve mounted on a stem that projects upwardly from the floor engaging or other terminal element of a furniture glide unit or plug. This sleeve is formed and mounted on the stem in a manner to be axially and laterally compressed when the device is entered into the hollow end of a tubular furniture leg, or the like, and when fully entered therein exerts internal, expanding force against the tubular end, any axial force exerted on the unit tending to withdraw the unit from the hollow end causing the sleeve to wedge under corresponding pressure between the hollow end of the leg and the stem of the unit thereby securing additional resistance to axial withdrawal of the unit from its operative position on the said hollow end.

With these and other objects in view, my invention will be more fully described, illustrated in the accompanying drawings, and specifically pointed out in the appended claims.

In the drawing:

FIG. 1 is a side elevational view of my unit.

FIG. 2 is a top plan view of the unit shown in FIG. 1.

FIG. 3 is an enlarged section taken on line 3—3 of FIG. 1.

FIG. 4 is a view similar to FIG. 3 showing my unit applied to the hollow end of a tubular member.

FIG. 5 is fragmental view similar to FIG. 3 showing a modified form of my unit.

FIG. 6 is a fragmental view like FIG. 3 showing another modification of my unit.

My furniture glide unit according to the illustrated examples of my invention shown in the drawing includes a suitable ground engaging element in the nature of a cushioned swivel glide 10 that has a cup-shaped shoe 11 terminating in an inwardly turned, upper edge portion 12. A ring-shaped plate 13 has a downturned peripheral edge portion 14 engaged under the inturned, upper edge portion 12 of the cup-shaped shoe 11, and has its inner marginal portion turned upwardly and formed as a socket element 15. A pintle shank 16 having a round head 160 formed on its lower end projects upwardly from the glide element, said round head being adapted to swivel in the socket element 15 and project upwardly therefrom, the entire shoe structure being filled with a rubber cushion material 17. Washer like members 18 surround the pintle shank and are supported upon the round head 160 of the pintle shank, said washers in turn supporting a ferrule 19 adapted to snugly receive the exterior end portion of the tubular leg of a piece of furniture, or the like.

The mount or attachment device for my unit comprises a deformable, resilient sleeve member 20 made of elastic rubber, or other suitable resilient material, which surrounds the upper end of the pintle shank and is mounted thereon against axial displacement by a means of an upwardly and outwardly flaring shoulder portion 21 integrally formed on the upper end of the pintle shank. It is contemplated that the pintle may be either solid or tubular and that the sleeve member 20 may be cut from stock that has a uniform outside diameter slightly greater than the inside diameter of the tubular member into which the sleeve member is to be fitted and that the stock have a uniform inside diameter which will snugly fit the particular pintle shank. In the process of assembling the unit the upper end of the pintle shank is flared outwardly approximately to an included angle of 60° thus securing the mount to the unit and forming on the upper end of the sleeve a deformable, upwardly and outwardly flaring portion 22 which normally has an outside diameter considerably greater than the inside diameter of the hollow furniture leg and upon insertion thereinto functions as a wedge element between the leg and flared end portion of the pintle shank to prevent axial withdrawal of the unit from the tubular leg, as will more fully appear hereinafter.

With reference to FIG. 5 it will be noted that the deformable, resilient sleeve member of FIGS. 1–4 which surrounds the pintle shank 16 is sectionalized whereby an upper section 23 may have a slightly different resiliency than the lower section 24. In this respect it is contemplated that the upper section 23 be made of a more resilient and more readily deformable material than the lower section 24 whereby under sufficient axially exerted withdrawing pressure the glide unit may be removed from a furniture leg without harming the leg or the glide. This is accomplished by permitting the more resilient upper section of the sleeve member to merely flow around the upwardly flaring upper end 21 of the pintle so that the unit can be detached from the tubular end of the furniture leg when desirable.

With reference to FIG. 6 I have shown another modification of my invention that will adapt it to tubular furniture legs, or the like, that have large internal diameters. A metal cup 25 is positioned wtihin the ferrule 19 in spaced relation therewith and concentric with the pintle shank 16, the upper end portion of the cup being flared outwardly at 26 to receive a corresponding, outwardly flared peripheral portion 27 on a washer 28 mounted on the top of the pintle shank. The pintle shank is turned outwardly at its upper end 29 to secure the cup and washer on the glider unit, a large resilient and deformable rubber sleeve member 30 encircling the metal cup and deformed thereby at its upper end to provide an upwardly and outwardly flaring portion 31 thereon.

In operation, and with particular reference to FIG. 4, my glider units are secured to the hollow ends 32 of tubular furniture by manually pushing their attachment devices into the hollow ends or in some instances an impact tool, such as a rubber mallet, may be used to drive the glide unit into its operative position. In either event the outwardly and upwardly flaring upper end portions of the deformable and resilient sleeve members will readily be axially and laterally compressed as the unit is entered into the end of the tubular leg and when the unit has been entered to its operative position the contracted upper end of the sleeve body will exert lateral expanding force against the interior of the tube to secure the unit on the leg. Axial force tending to withdraw the glide from the leg will cause the contracted, upper end of the sleeve body to wedge under a corresponding pressure between the internal wall of the leg and the flared upper end of the pintle to preclude withdrawal of the glide from the leg except where, as indicated in FIG. 5, the sleeve is purposely sectionalized and provided at its upper end with a relatively soft rubber body which will flow around the flared upper end of the pintle and the tubular member for ready detachment of the glide from the leg.

What is claimed is:

1. A glide mounting for axial insertion into the open end of a straight walled tubular leg member comprising an elongated, upstanding pintle having a shank portion mounted on and projecting from the shoe for insertion into the central portion of the lower end of the tubular member, said pintle having an outwardly and upwardly flaring shoulder portion mounted in fixed position on the upper end of the shank portion, a support element mounted on the pintle shank portion and engaging the lower end of the tubular member, an elastic rubber sleeve positioned on the element and surrounding the pintle shank portion, said sleeve normally having a cross sectional configuration conforming to the interior wall of the end of the tubular member, said shoulder portion having a maximal lateral configuration conforming to and slightly undersized with respect to the interior configuration of the end of the tubular member, and a corresponding outwardly and upwardly flaring portion formed on the sleeve snugly receiving the flared shoulder portion on the pintle, said flaring portion on the sleeve normally having a maximal cross sectional configuration greater than the interior configuration of the end of the tubular member, and adapted to be compressed to fit into the tubular end when the mount is axially forced into the said end whereby the flared end of the sleeve and the sleeve body will be crowded into the space between the shank portion and the shoulder portion of the pintle and the interior straight wall of the end of the tubular member.

2. A glide mounting as set forth in claim 1 characterized by the fact that the sleeve is sectionalized in a heightwise direction, the lower section of the sleeve having a less resilient body than the body of its upper section.

References Cited in the file of this patent

UNITED STATES PATENTS

| | | |
|---|---|---|
| 1,223,877 | Hilfrank | Apr. 24, 1917 |
| 2,456,480 | Austin | Dec. 14, 1948 |
| 2,513,193 | Miller | June 27, 1950 |
| 2,848,733 | Thornsbury | Aug. 26, 1958 |
| 2,876,485 | Cowles | Mar. 10, 1959 |

FOREIGN PATENTS

| | | |
|---|---|---|
| 6,619 | Great Britain | June 1, 1905 |